United States Patent [19]

Curtis

[11] Patent Number: 4,841,559
[45] Date of Patent: Jun. 20, 1989

[54] TELEPHONE NETWORK INTERFACE TESTER

[75] Inventor: Guy T. Curtis, Ashburnham, Mass.

[73] Assignee: TriTech Laboratories, Inc., North Andover, Mass.

[21] Appl. No.: 187,959

[22] Filed: Apr. 29, 1988

[51] Int. Cl.[4] .............................................. H04M 1/24
[52] U.S. Cl. .......................................... 379/27; 379/32
[58] Field of Search ................... 379/22, 27, 29, 28, 379/32

[56] References Cited

U.S. PATENT DOCUMENTS 4,513,176  4/1985  Fostueit ................................. 379/27
4,581,494  4/1986  Pickens ................................. 379/27

Primary Examiner—Stafford D. Schreyer
Attorney, Agent, or Firm—Lee & Smith

[57] ABSTRACT

A device for interposing in a telephone service line for testing the service line and a telephone network attached to the service line. Included is a first circuit for testing the service line, a second circuit for testing the telephone network, a third circuit for providing a normal connected between the service line and the telephone network, a fourth circuit for generating a reset signal on the service line, and a fifth circuit for testing an individual handset. Connectors are provided for connecting the device in circuit between a telephone service line and a telephone network. A multiposition switch is included for switching between the first through fifth circuits.

20 Claims, 2 Drawing Sheets

TELEPHONE NETWORK INTERFACE TESTER

BACKGROUND OF THE INVENTION

This invention relates to telephone apparatus, and in particular to a device adapted for interposing in a telephone service line for testing of the service line and any telephone network attached to the service line.

In the past, the entire telephone network including the handset was owned and serviced by the provider of telephone services, normally a local telephone company. With modern divestitures, however, typically the telephone company owns only the service line leading to a building, with the building owner either owning or leasing the telephone line network within the building, and all telephone handsets connected to the telephone network. Since the telephone company no longer provides free service, it has become increasingly important for the building owner to be able to test his telephone network to assure its reliable operation and, when problems occur, quickly identify those problems, whether those problems have occurred in the service being provided to the building, the network within the building, or the handsets connected to the network.

SUMMARY OF THE INVENTION

The invention relates to a test device particularly suitable for interposing in a multiple conductor telephone service line for testing the service line and any telephone network attached to the service line. The invention includes connector means for connecting the device in circuit between the telephone service line and a telephone network. A first circuit is provided for testing the service line, the first circuit including an amplifier for amplifying electrical signals on the service line and a transducer connected to the amplifier to provide an audible representation of the amplified electrical signals. A second circuit is provided for testing the telephone network, the second circuit including an indicator for identifying a plurality of conditions of the telephone network. Switching means is provided for switching between the first and second circuits.

In addition to the amplifier, the first circuit means also includes means for generating a dial tone request signal on the service line to the central telephone office, to which the service line is connected. In accordance with the preferred embodiment of the invention, the amplifier is a two stage amplifier and includes a coupling capacitor between the two stages to prevent undesired feedback.

The service line typically comprises first and second conductors, and the indicator of the second circuit comprises a first visible indicator connected in series with one of the conductors and a second visible indicator connected between the conductors. The visible indicators preferably comprise light emitting diodes.

The invention includes a third circuit for providing a normal connection between the service line and the telephone network. A visible indicator, preferably also a light emitting diode, is connected in parallel between the conductors of the service line to indicate a normal connection between the service line and the telephone network.

The invention also includes a fourth circuit for generating a reset signal on the service line. To produce the reset signal, the fourth circuit comprises an open circuit between the two conductors of the service line.

The invention also includes a fifth circuit for testing an individual telephone handset. Included in the fifth circuit is a connection of the first circuit in parallel with the tested telephone handset.

Preferably, the switching comprises a rotary switch which is switched to alternatively connect the first through fifth circuits. A double pole, multi position rotary switch is that utilized in the invention.

BRIEF DESCRIPTION OF THE DRAWINGS

The invention is described in greater detail in the following description of an example embodying the best mode of the invention, taken in conjunction with the drawing figures, in which.

DESCRIPTION OF AN EXAMPLE EMBODYING THE BEST MODE OF THE INVENTION

Figure 1:
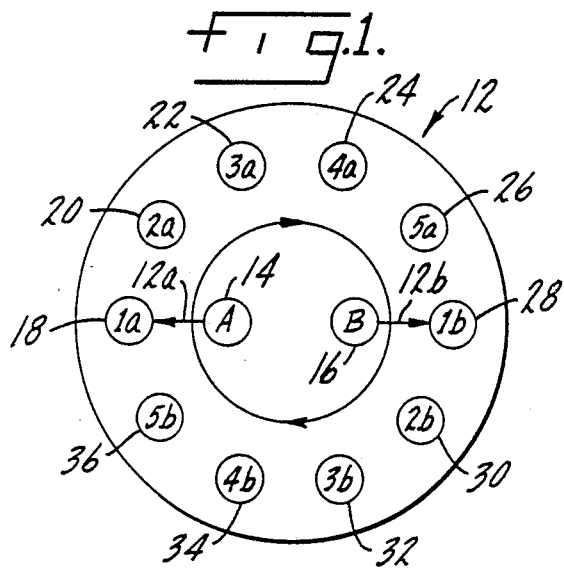
FIG. 1 is a schematic illustration of a rotary double pole, double throw switch utlized in the invention.
Figure 8:
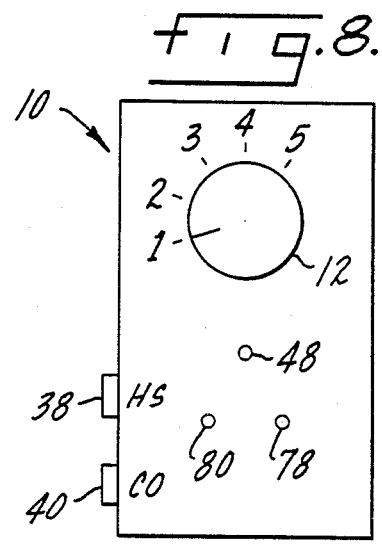
FIG. 8 is a schematic top view of the testing device of the invention.

The testing device according to the invention is shown schematically at 10 in FIG. 8, and is comprised of a series of circuits illustrated in FIGS. 2 through 7 which are interconnected by rotary switch 12 shown schematically in FIG. 1. Each of the circuits of FIGS. 2, 3, 5, 6 and 7 serves a different function, with the circuit of FIG. 4 being utilized in connection with the circuits of FIGS. 5 and 7, as described in further detail below.

The rotary switch 12 is a common five position, double pole switch. As illustrated, the switch includes a pair of poles 14 and 16 which, when the switch is rotated, are alternatively connected by contacts 12a and 12b to a series of terminals 18 through 36 in a conventional and well-known fashion. For example, when the switch is in the position shown in FIG. 1, the pole 14 is connected to the terminal 18, while the pole 16 is connected to the terminal 28. Rotation of the switch 12 in the clockwise direction will next connect the pole 14 to the terminal 20 and the pole 16 to the terminal 30, and so on, through connection of the pole 14 to the terminal 26 and the pole 16 to the terminal 36. For convenience, the five rotary positions of the switch 12 have been identified by the numbers 1 through 5 in both FIGS. 1 and 8.

Figure 2:
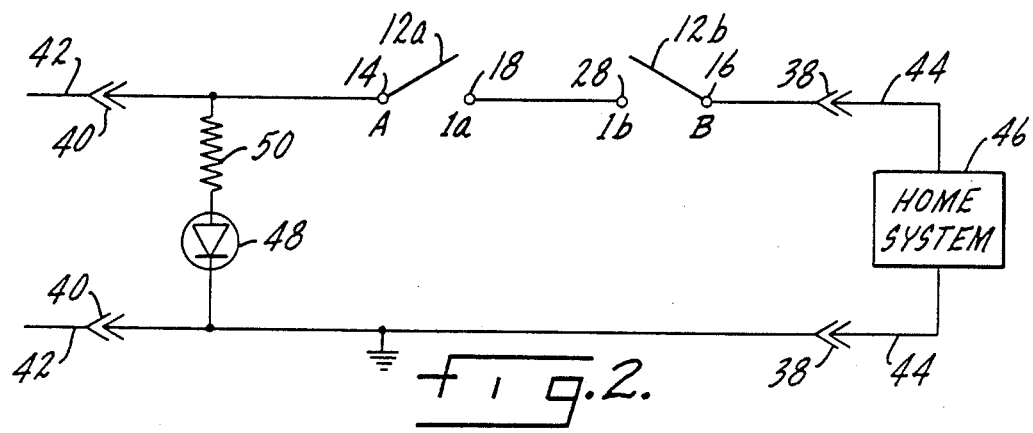
FIG. 2 illustrates a circuit of the invention for providing a normal connection between a telephone service line and a telephone network.

FIG. 2 illustrates connection of the invention while in circuit for normal operation of a telephone network, such that the device 10 according to the invention, although connected between a telephone service line and a telephone network, appears transparent to both the telephone service line and the telephone network. For the purposes of description, the switch 12 is illustrated in its first position, with the pole 14 connected to the terminal 18 and the pole 16 connected to the terminal 28, although it should be quite evident that any of the positions of the switch 12 may be wired to perform the functions of the circuit of FIG. 2, as described immediately below.

The invention is intended to be used with modern telephone equipment connectors, the connectors commonly known as "modular" connectors. In a typical modern telephone installation, a home wiring connector is plugged with a jack which is in turn connected to a telephone service line leading to a central office of the telephone company. The invention is preferably installed at that location, with the home wiring connector being connected into the device 10 and the device 10 then being plugged into the jack. To that end, the device 10 includes two modular receptacles 38 and 40, the receptacle 38 being that into which the wiring for the home system is connected, and the receptacle 40 being that which is connected to the home jack (not illustrated) by means of a suitable patch cord. The connections to the receptacles 38 and 40 are shown schematically in FIGS. 2, 3 and 5 through 7.

Returning to FIG. 2, leading to and plugged into the receptacle 40 are a pair of leads 42 which, as noted above, are intended to be plugged into a house wiring jack which in turn is connected to a telephone service line leading to the central office of the local telephone company. The leads 42 may also be directly connected to the telephone service line in any number of well known fashions which need not further be discussed.

Leads 44 are connected to the modular receptacle 38 and lead from the device 10 to the remainder of the home system shown in block form at 46. The term "home system" is intended to refer to any remote telephone system having one or more telephone handsets.

In the circuit of FIG. 2, the switch 12 is connected for normal operation of the home system 46. That is, when the switch 12 is rotated such that the pole 14 is connected to the terminal 18 and the pole 16 is connected to the terminal 28, the telephone network of the home system 46 will function as if the device 10 is transparent and not in circuit. In other words, to the central office, it will appear that the leads 44 and 42 are directly connected to one another.

Included in the circuit of FIG. 2 is a light emitting diode 48 and a resistor 50. The resistor is large enough (preferably 12K Ohm) and is connected in series with the diode 48 and in parallel with the home system 46 so that the central telephone office will not recognize the light emitting diode 48. When the light emitting diode 48 is illuminated and the switch 12 is in the first position, the home system 46 is operating normally.

Figure 3:
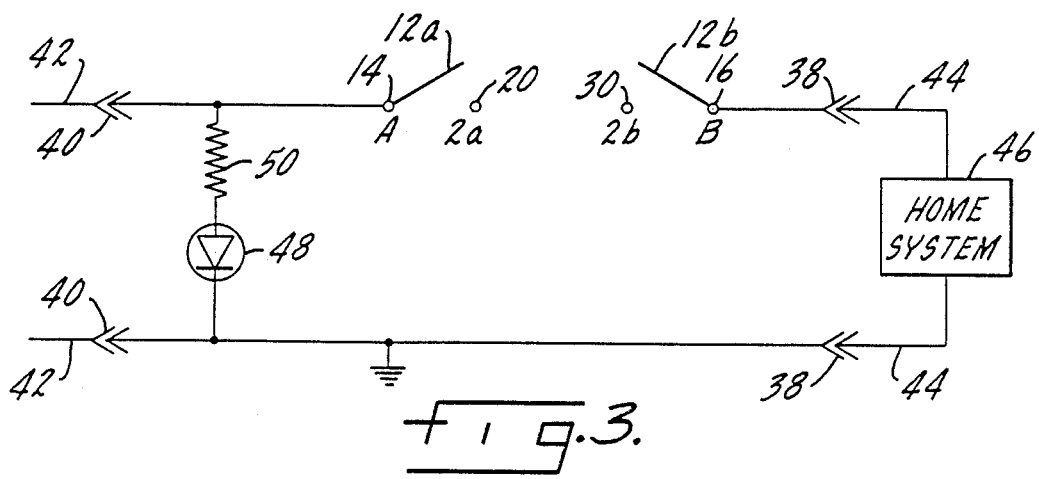
FIG. 3 illustrates a circuit according to the invention for generating a reset signal on the telephone service line.

FIG. 3 illustrates a circuit which, in accordance with conventional telephone system design, will signal a central office to resume normal telephone operations. When the switch 12 is switched to the second position, the terminals 20 and 30 are not electrically connected, and therefore the home system 46 is not connected to the central office. This presents an open circuit to the central office, signaling the central office to resume normal operations. Such is necessary if wiring in the home system is shorted or if a telephone is left in an off hook orientation for an extended period of time. When normal operations have been resumed at the telephone central office, the light emitting diode 48 will be illuminated. If the diode 48 is not illuminated, then the user of the device 10 is aware that no signal has been received from the central office, and he should investigate a problem either with the telephone service line or the central office.

Figure 4:
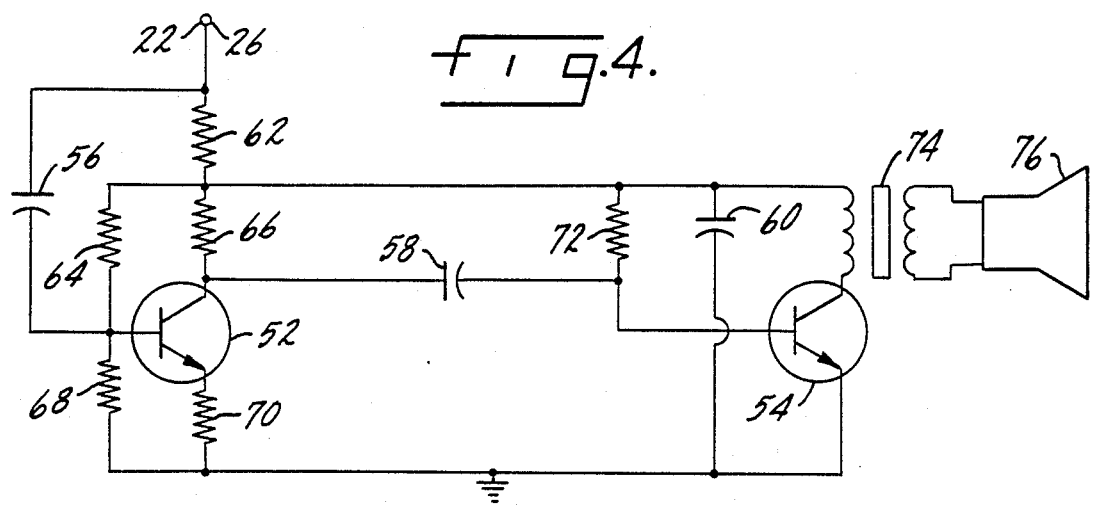
FIG. 4 illustrates a two stage amplifier and audible transducer utilized in connection with the invention.

The circuit of FIG. 4 is a two-stage amplifier comprised of a pair of transistors 52 and 54, associated biasing resistor networks, and capacitors 56, 58 and 60. The resistors are not described in detail, but are given reference numerals and their preferred values, along with those of other pertinent circuit elements, are set forth in Table which follows the description of the circuits of FIGS. 2 through 7. The capacitor 58 passively couples the transistor 52 to the transistor 54, with the capacitors 58 and 60 also serving as a low pass filter to eliminate high frequencies. An audio transformer 74 is connected to a transducer in the form of a speaker 76 which thus will audibly signal any input to the amplifier circuit of FIG. 4 at the terminals 22 or 26.

Figure 5:
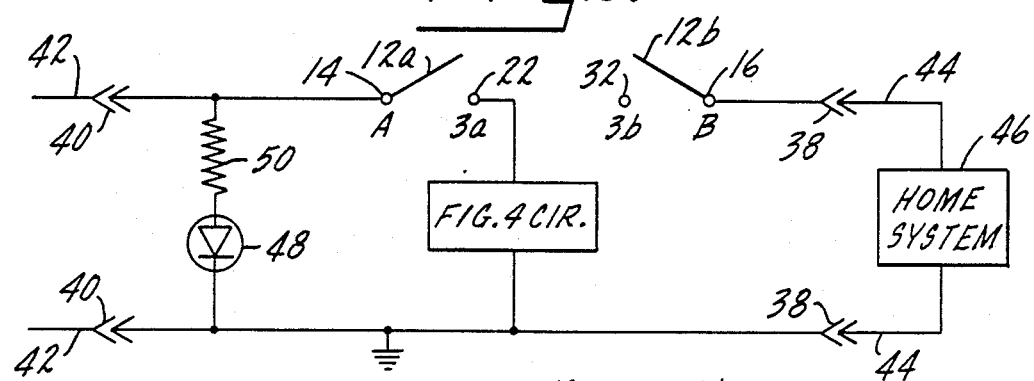
FIG. 5 illustrates a circuit according to the invention utilizing the circuit of FIG. 4 and connected for testing the telephone service line.
Figure 7:
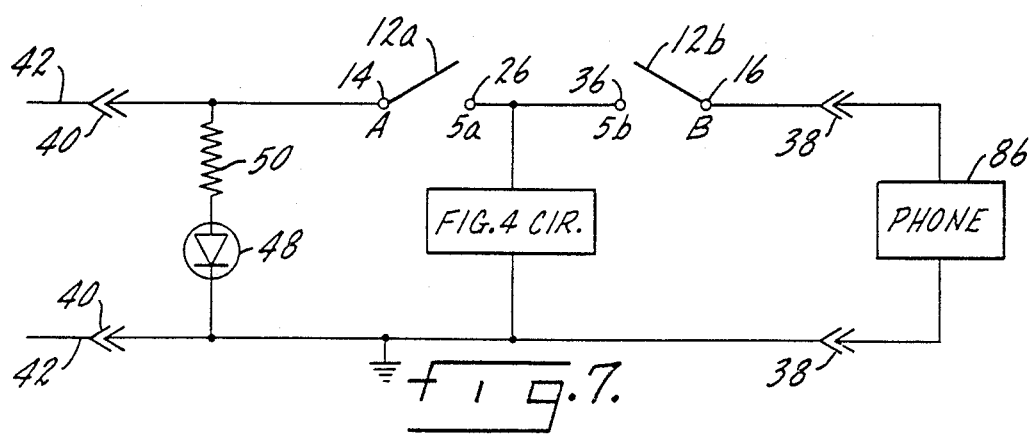
FIG. 7 illustrates a circuit utilizing the circuit of FIG. 4 for testing an individual telephone handset.

The amplifier circuit of FIG. 4 is utilized in connection with the circuits of FIGS. 5 and 7. Turning now to the circuit of FIG. 5, with the switch 12 in the third position, the pole 14 is connected to the terminal 22, which in turn is connected to the amplifier circuit if FIG. 4. However, there is no connection between the terminals 22 and 32, and therefore the home system 46 is not activated. In the switch orientation of FIG. 5, if the central office is providing a normal signal, a dial tone will be heard in the speaker 76, and the light emitting diode 48 will be illuminated.

Figure 6:
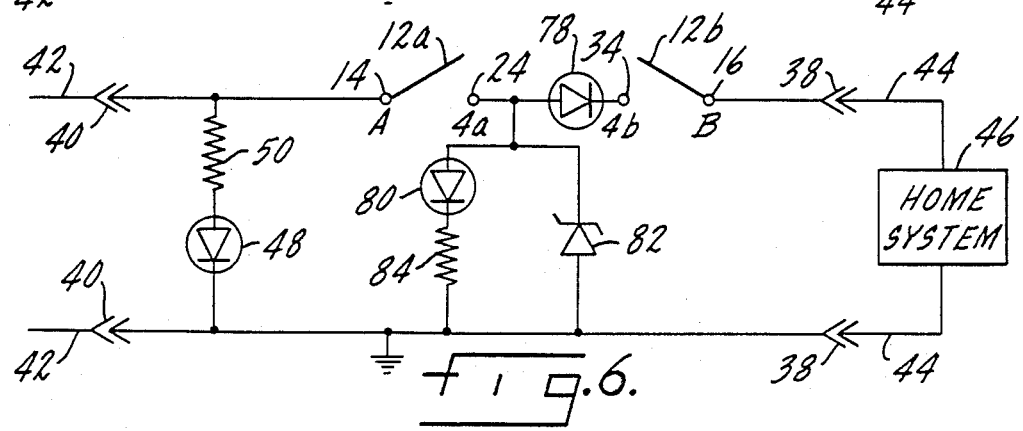
FIG. 6 illustrates a circuit according to the invention for testing the telephone network.

FIG. 6 illustrates a circuit for testing the home system 46. With the switch 12 in the fourth position, the pole 14 is connected to the terminal 24 and the pole 16 is connected to the terminal 34. A light emitting diode 78 is connected between the terminals 24 and 34, while a light emitting diode 80 and zener diode 82 are connected in parallel with one another in parallel with the home system 46. An appropriate biasing resistor 84 is also employed.

When the device 10 is connected as shown in FIG. 6, if there are no problems with the home system 46 and all telephones are in an on-hook orientation, the light emitting diode 80 will glow. If one of the telephones of the home system 48 is not on hook, both light emitting diodes 78 and 80 will glow. However, if there is a short in either the leads 44 or the home system 46, only the light emitting diode 78 will glow, advising the user that repair is necessary.

Because the impedance of the light emitting diode 80 and resistor 84 is substantially less than that of the light emitting diode 48 and resistor 50, in the circuit of FIG. 6, the light emitting diode 48 will not be illuminated when the switch 12 is in the fourth position. If there is a short in the home system 46 or the leads 44, or if the system is operating properly but one of the telephones of the system 46 is in an off-hook orientation, again the impedance of the light emitting diode 78 and the home system 46 is substantially less than that of the light emitting diode 48 and the resistor 50. Therefore the diode 48 will not be illuminated whenever the switch 12 is in the fourth position.

The circuit of FIG. 7 is intended for use in testing a single telephone handset 86. The modular connector of the handset 86 (not illustrated) is connected directly to the modular receptacle 38 and the switch 12 is rotated to the fifth position. In this orientation, the pole 14 is connected to the terminal 26 and the pole 16 is connected to the terminal 36. The terminals 26 and 36 are connected to one another, with the amplifier circuit of FIG. 4 being connected also to the terminal 26. Thus, not only will the telephone handset 86 be connected for normal operation, but also operation of the telephone handset 86 will be heard in the speaker 76.

Following is table of prefered values for the circuit elements of the drawing figures:

TABLE I

Table Of Circuit Elements

| Reference Numeral | Description | Value |
| --- | --- | --- |
| 48 | LED | 1.9 v, 2 ma |
| 78 | LED | 4 v, 10 ma |
| 80 | LED | 2.8 v, 30 ma |
| 50 | Resistor | 12K Ohm |
| 62 | Resistor | 200 Ohm |
| 64 | Resistor | 100K Ohm |
| 66 | Resistor | 10K Ohm |
| 68 | Resistor | 47K Ohm |
| 70 | Resistor | 1K Ohm |
| 72 | Resistor | 110K Ohm |
| 84 | Resistor | 2.2K Ohm |
| 56 | Capacitor | .2 μF |
| 58 | Capacitor | 1 μF |
| 60 | Capacitor | 470 μF |

As explained above, in use, it is preferred that the device 10 be connected in circuit between a telephone service line leading from the central telephone office and a telephone network installed within a building, the network having one or more telephone handsets as a part of the network. When the switch 12 is in the first position, the circuit of FIG. 2 is connected and normal operation of the home system 46 will be signified by illumination of the light emitting diode 48. When the switch 12 is in the second position, the circuit of FIG. 3 is connected, and the home system 46 is not connected to the telephone service line. In accordance with convention, the central office would automatically reset its equipment.

When the switch 12 is in the third position, the circuit of FIG. 5 is connected. In this orientation, again the home system 46 is not connected to the central office, and instead a dial tone will be heard through the speaker 76. At the same time, the light emitting diode 48 will glow. If not, this signifies that there is a problem with the telephone service line leading to the home.

With the switching in the fourth position, the circuit of FIG. 6 is connected, and the home system 46 is connected to the central office. If there are no problems with the home system 46 and if all telephone handsets are in an on-hook orientation, only the light emitting diode 80 will glow. If one or more of the telephone handsets of the home system 46 is off hook, and the system is otherwise functioning properly, both the light emitting diodes 78 and 80 will glow. However, if there is a short in the home system 46, only the light emitting diode 78 will glow, alerting the user that the home system 46 is in need of repair.

The circuit of FIG. 7 is used to check a telephone handset 86 individually. With the handset 86 connected directly to the receptacle 38, and the switch 12 in the fifth position with the telephone handset 86 in an off hook orientation, a dial tone will be heard in the speaker 76. Operation of the buttons or dial of the telephone handset 86 will also be heard in the speaker 76. If not, the user will know that the handset 86 requires repair.

It should be evident that changes may be made to the invention. For example, the values of the circuit elements set forth in the above table are preferred, but not mandatory. It will be evident to one skilled in the art that modifications can be made with the same resulting operation of the device 10. Various changes can be made to the invention without departing from the spirit thereof or scope of the following claims.

What is claimed is:

1. A device for interposing in a multiple conductor telephone service line for testing the service line and a telephone network attached to the service line comprising:
   a. connector means for connecting the device in circuit between the telephone service line and the telephone network,
   b. first circuit means for testing said service line, including an amplifier for amplifying electrical signals on said service line and a transducer connected to said amplifier to produce an audible representation of said amplified electrical signals,
   c. second circuit means for testing said telephone network, including indicator means for identifying a plurality of conditions of said telephone network, and
   d. means for switching between said first and second circuit means.

2. A device according to claim 1 in which said first circuit means includes means for generating a dial tone request signal on said service line.

3. A device according to claim 1 in which said amplifier is a two stage amplifier and including coupling capacitor means between the two stages of said amplifier.

4. A device according to claim 1 in which said service line comprises first and second conductors, and in which said indicator means comprises a first visible indicator connected in series with one of said conductors and a second visible indicator connected between said conductors.

5. A device according to claim 4 including a resistor in series with said second visible indicator.

6. A device according to claim 4 in which said visible indicators comprise light emitting diodes.

7. A device according to claim 4 including a zener diode in parallel with said second visible indicator.

8. A device according to claim 1 including third circuit means for providing a normal connection between said service line and said telephone network, said switching means including means for switching between said first, second and third circuit means.

9. A device according to claim 8 in which said service line comprises first and second conductors, and including a visible indicator connected between said conductors.

10. A device according to claim 9 in which said visible indicator comprises a light emitting diode, and including a resistor connected in series with said diode.

11. A device according to claim 1 including fourth circuit means for generating a reset signal on said service line, said switching means including means for switching between said first, second and fourth circuit means.

12. A device according to claim 11 in which said service line comprises first and second conductors, and said fourth circuit means comprises an open circuit between said conductors.

13. A device according to claim 1 including fifth circuit means for testing a telephone handset, said switching means including means for switching between said first, second and fifth circuit means.

14. A device according to claim 13 in which said fifth circuit means includes means connecting said first circuit means in parallel with a telephone handset.

15. A device according to claim 1 in which said switching means comprises a rotary switch.

16. A device according to claim 15 in which said rotary switch is double pole, multi position.

17. A device for interposing in a multiple conductor telephone service line for testing the service line and a telephone network attached to the service line, comprising
   a. connector means for connecting the device in circuit between the telephone service line and the telephone network,
   b. first circuit means for testing said service line,
   c. second circuit means for testing said telephone network, including indicator means for identifying a plurality of conditions of said telephone network,
   d. third circuit means for providing a normal connection between said service line and said telephone network,
   e. fourth circuit means for generating a reset signal on said service line,
   f. fifth circuit means for testing a telephone handset, and
   g. means for switching between said first through fifth circuit means.

18. A device according to claim 17 in which service line comprises first and second conductors, and in which said indicator means comprises a first visible indicator connected in series with one of said conductors and a second visible indicator connected between said conductors.

19. A device according to claim 17 in which said service line comprises first and second conductors, and including a visible indicator connected between said conductors.

20. A device according to claim 17 in which said fifth circuit means includes means connecting said first circuit means in parallel with a telephone handset.

* * * * *